United States Patent [19]

Baron et al.

[11] Patent Number: 6,125,328

[45] Date of Patent: *Sep. 26, 2000

[54] SYSTEM AND METHOD FOR PROJECTING STORMS USING NEXRAD ATTRIBUTES

[75] Inventors: Robert O. Baron, Huntsville; Tom S. Thompson, Athens; Tony L. Benson, Huntsville, all of Ala.

[73] Assignee: Baron Services, Inc., Huntsville, Ala.

[ * ] Notice: This patent issued on a continued prosecution application filed under 37 CFR 1.53(d), and is subject to the twenty year patent term provisions of 35 U.S.C. 154(a)(2).

[21] Appl. No.: 09/021,448

[22] Filed: Feb. 10, 1998

Related U.S. Application Data

[60] Provisional application No. 60/036,952, Feb. 10, 1997.

[51] Int. Cl.$^7$ ..................................................... G06F 19/00
[52] U.S. Cl. ................................................................ 702/3
[58] Field of Search ............................. 702/3, 4; 342/26; 706/931

[56] References Cited

U.S. PATENT DOCUMENTS

| | | |
|---|---|---|
| 4,277,845 | 7/1981 | Smith et al. . |
| 4,347,618 | 8/1982 | Kavouras et al. . |
| 4,402,672 | 9/1983 | Lowe, Jr. . |
| 4,422,037 | 12/1983 | Coleman . |
| 4,506,211 | 3/1985 | Coleman . |
| 4,521,857 | 6/1985 | Reynolds, III . |
| 4,649,388 | 3/1987 | Atlas . |
| 4,712,108 | 12/1987 | Schwab . |
| 5,111,400 | 5/1992 | Yoder . |
| 5,117,359 | 5/1992 | Eccles . |
| 5,121,430 | 6/1992 | Ganzer et al. . |
| 5,175,551 | 12/1992 | Rubin . |
| 5,208,587 | 5/1993 | Cornman . |
| 5,255,190 | 10/1993 | Sznaider . |
| 5,315,297 | 5/1994 | Cornman . |
| 5,351,045 | 9/1994 | Cornman . |

(List continued on next page.)

OTHER PUBLICATIONS

Ciardi and Botner, "Beta Test Plain for Build 9.0," WSR–88D Operational Support Facility (USA), (Jul. 13, 1996).

Operations Training Branch, "Build 9.0 Precursor Training," Operations Training Branch (USA), (Jul. 15, 1996).

Kavouras, Inc., "AutoTrak," Kavouras, Inc. (USA), (1997).

Phillips, "Time Is On Your Side With NEXRAD Autotrak," On the Front, Kavouras, Inc. (USA). vol. 6 (No. 4), p. 6, (Jul., 1996).

Chenevert, "The WSR–88D Storm Identification and Tracking Algorithms," On the Front, Kavouras, Inc. (USA), vol. 6 (No. 4), p. 5, (Jul., 1996).

Brown and Wood, "On the Interpretation of Single–Doppler Velocity Patterns within Severe Thunderstorms," Weather and Forecasting, American Meterological Society (USA), (Sep. 12, 1990), pp. 32–48.

Brady, Schroeder and Poellot, "Automatic Identification of Tracking of Radar Echoes in Hiplex," Department of Aviation, Univeristy of North Dakota (Grand Forks, ND), pp. 139–143.

(List continued on next page.)

Primary Examiner—Donald E. McElheny, Jr.
Attorney, Agent, or Firm—Lanier, Ford, Shaver & Payne, P.C.; David L. Berdan; Frank M. Caprio

[57] ABSTRACT

The subject invention provides an improved system and method for combining data obtained from the NEXRAD™ system of the National Weather Service ("NWS") with geographical and topological data base information to achieve an improved and informative graphical storm-tracking display able to project the movement of a storm with a single user-operation. The method of projecting storm movement includes the following steps: collecting NEXRAD data attributes from a weather data source; calculating storm position using the collected NEXRAD attributes; calculating projected storm movement using the storm position and the collected NEXRAD attributes; displaying a graphic representation of the projected storm movement.

22 Claims, 5 Drawing Sheets

U.S. PATENT DOCUMENTS

| | | |
|---|---|---|
| 5,359,330 | 10/1994 | Rubin et al. . |
| 5,406,481 | 4/1995 | Shinozawa et al. .......................... 702/3 |
| 5,432,895 | 7/1995 | Myers . |
| 5,490,239 | 2/1996 | Myers . |
| 5,517,193 | 5/1996 | Allison et al. . |
| 5,583,972 | 10/1996 | Miller . |
| 5,596,332 | 1/1997 | Coles et al. . |
| 5,654,886 | 8/1997 | Zereski, Jr. et al. .......................... 702/3 |
| 5,717,589 | 2/1998 | Thompson et al. .......................... 702/3 |
| 5,839,089 | 11/1998 | Yasuda et al. .............................. 702/3 |

OTHER PUBLICATIONS

Crane, "Automatic Cell Detection and Tracking," IEEE Transactions on Geoscience Electronics, Geoscience Electronics (USA), vol. 17 (No. 4), pp. 250–262, (Oct., 1979).

Davies and Johns, "Some Wind and Instability Parameters Associated with Strong and Violent Tornadoes 1. Wind Shear and Helicity," The Tornado: Its Structure, Dynamics, Prediction, and Hazards, American Geophysical Union (USA), pp. 573–582, (1993).

Sappanos, "New WXAdvisor has Arrived for Triton I7 Triton I7 Release 3.0 Automates Weather Room," On the Front, Kavouras, Inc. (USA), vol. 4 (No. 12), p. 13, (Nov., 1993).

Kavouras, Inc., "It's Breakthrough Time!," NAB brochure, Kavouras, Inc. (USA), (1993), One Page.

Baron Services, Inc. "OmniWXSystems," OmniWXSystems sales brochure, Baron Services, Inc. (USA), (Feb. 1, 1994).

Kavouras, Inc., "Storm Tracker Demonstration Program," Kavouras, Inc. (USA), pp. 1–3, (May 11, 1992).

Kavouras, Inc., "NEXRAD AutoTrack Overview," Kavouras, Inc. (USA), (Dec. 20, 1995).

Baron Services, Inc., "Collins Radar, Dramatic New Upgrades," Baron Services, Inc. (USA), Jul., 1995).

Forsyth, "Real–Time Forecasting of Echo–Centroid Motion, A Thesis Submitted to the Graduate Faculty, The University of Oklahoma Graduate College," (1979).

Klazura and Imy, "A Description of the Initial Set of Analysis Products Available from the NEXRAD WSR–88D System," Bulletin of the American Meteorological Society, American Meteorological Society (USA), vol. 74 (No. 7), pp. 1293–1311, (Jul., 1993).

Crum and Alberty, "The WSR–88D and the WSR–88D Operational Support Facility," Bulletin of the American Meteorological Society, American Meteorological Society (USA), vol. 74 (No. 9), pp. 1669–1687, (Sep., 1993).

Dixon and Wiener, "Titan: Thunderstorm Identification, Tracking, Analysis, and Nowcasting –A Radar–based Methodology," Journal of Atmospheric and Oceanic Technology, American Meteorological Society (USA), vol. 10 (No. 6), pp. 785–797, (Dec., 1993).

U.S. Department of Commerce, Office of the Federal Coordinator for Meteorological Services and Supporting Research, "Doppler Radar Meteorological Observations, Part A, System Concepts, Responsibilities, and Procedures," Federal Meteorological Handbook No. 11, (Jun., 1991).

Greene and Clark, "Vertically Integrated Liquid Water –A New Analysis Tool," Monthly Weather Review, United States Department of Commerce (USA), vol. 100 (No. 7), pp. 548–552, (Jul., 1972).

Wilk and Gray, "Processing and Analysis Techniques Used with the NSSL Weather Radar System," 14th Radar Meteorology Conference, pp. 369–374, (Nov. 17, 1970).

Bjerkaas and Forsyth, "An Automated Real–Time Storm Analysis and Storm Tracking Program (WEATRK)," Air Force Systems Command, USAF (USA), (Oct. 1, 1980), pp. 1–115.

Johnson, MacKeen, Witt, Mitchell, Stumpf, Eilts, Thomas, "The Storm Cell Identification and Tracking Algorithm: An Enhanced WSR–88D Algorithm," Weather and Forecasting, American Meteorological Society (USA), vol. 13 (No. 2), (Dec. 9, 1997), Abstract Only.

Rosenfeld, "Objective Method for Analysis and Tracking of Convective Cells as Seen by Radar," Journal of Atmospheric and Oceanic Technology, American Meteorological Society (USA), pp. 422–434, (Jan. 7, 1987).

SYSTEM AND METHOD FOR PROJECTING STORMS USING NEXRAD ATTRIBUTES

DESCRIPTION

This application claims priority from provisional application Ser. No. 60/036,952 filed Feb. 10, 1997 entitled "System and Method For Projecting Storms Using NEXRAD Attributes" which is incorporated herein by reference.

II. FIELD OF THE INVENTION

The present invention relates to an improved system and method for combining data obtained from the NEXRAD™ system of the National Weather Service ("NWS") with geographical and topological data base information to achieve an improved and informative graphical storm-tracking display able to predict and project the direction of a storm with a single user-operation.

III. BACKGROUND OF THE INVENTION

NEXRAD is a system of weather services provided by the NWS. NEXRAD employs a system of radars scattered throughout the country which provides weather data to subscribers. Subscribers, such as television stations desiring to transmit weather broadcasts, use data from the NEXRAD system in its basic form. Current systems of subscribers typically extract simple storm information from the NEXRAD data to provide viewers with basic storm location information.

One NEXRAD service is the "NEXRAD Attributes." This service provides the subscribers with detailed information concerning storms detected at each NEXRAD radar site. The NEXRAD Attributes data includes the following information for each storm:

| | |
|---|---|
| ID | a unique 3-digit identifier |
| AZ | the direction of the storin in degrees from the radar source |
| RANGE | the distance of the storm in nautical miles from the radar source |
| TVS | the likelihood of a tornado vortex signature (Yes or No) |
| MESO | the likelihood of mesocyclonic activity (Yes or No) |
| HAIL | the likelihood of hail (% change of hail, % chance of severe hail, approximate hail size in inches) |
| DBZM | the maximum DBZ level (a measurement of precipitation intensity) |
| FCST_ANGLE | forecasted movement angle (storm path) in degrees |
| FCST_MVMT | forecasted movement speed in nautical miles per hour |

The typical current NEXRAD system used by a NEXRAD subscriber receives NEXRAD data via a satellite downlink or over a wired network connection into a computer, such as the computer illustrated in the attached FIG. 1. Then, the current subscriber's system extracts the azimuth and range information of the subject storm. From this information, the current systems can plot a two dimensional representation of the storm. Most of the other information in the NEXRAD Attributes goes unused by current systems, although the user, typically a meteorologist, can review this data manually.

One problem with a subscriber's current system is that in order to predict the movement of a storm, the user must manually create projections from the NEXRAD Attributes data. Current systems do not have the capability to create a graphical representation of the storm movement from the NEXRAD Attributes data without substantial human involvement.

Moreover, the current graphical storm display is typically limited to simple two dimensional representations of the storm's location and little else. Typically the viewers of weather displays based on the current systems have only a vague concept of the proximity of the storm to their location. Current systems are incapable of displaying NEXRAD projection information concerning those storms in any appreciable graphical way.

IV. SUMMARY OF THE INVENTION

A method for projecting storms using NEXRAD attributes comprising the steps of: (a) collecting NEXRAD data attributes from a weather data source; (b) calculating storm position using the collected NEXRAD attributes; (c) calculating projected storm movement using the storm position and the collected NEXRAD data attributes; (d) displaying a graphic representation of the projected storm movement; (e) determining the communities in the path of the projected storm movement.

In addition, the present invention, in a preferred embodiment further comprises the following steps: (f) displaying the communities indicating the estimated time of arrival for the projected storm; (g) sorting multiple storms; (h) displaying the sorted storms in order of priority; and (i) displaying single storm details.

V. BRIEF DESCRIPTION OF THE DRAWINGS

VI. DETAILED DESCRIPTION OF THE INVENTION

Figure 3:
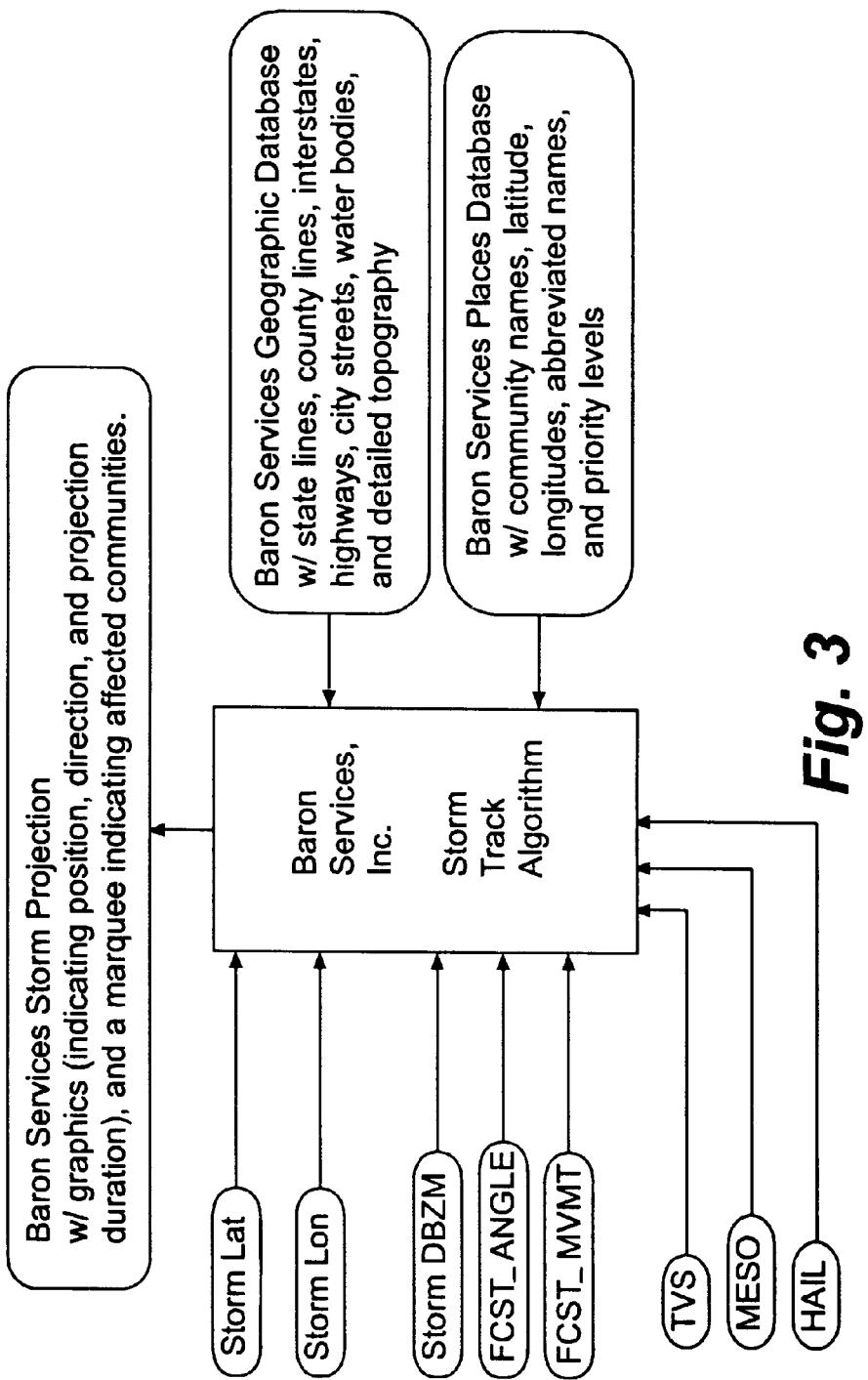
FIG. 3 is a diagram of the computer of FIG. 1 and its use of the information from the NEXRAD attributes and database information to create storm projections of the present invention.

The present invention improves over the prior art by utilizing the NEXRAD Attributes storm projection information, represented by the variables FCST_ANGLE and FCST_MVMT above and shown in FIG. 3, to provide the users of the present invention the ability to graphically display storm projection information with a single operation. The present invention extracts the NEXRAD Attributes storm projection information and adapts that information for graphical display. The use of the projection data in the present invention allows the user to have the storm location information graphically displayed, such as on a computer monitor screen or television set, overlaid with a graphical representation of the projected movement of the storm.

The steps which the present invention utilizes to achieve a storm projection system that will provide the user with storm prediction information in one operation can be briefly summarized as follows:

The first step is collecting NEXRAD Attributes for use by the storm projection system by receiving NEXRAD Attributes information via a satellite downlink, wired network, or other information transfer medium, and storing this information in a database.

In a preferred embodiment, the database contains the following attributes for each storm:

| Attribute | Range of Values |
|---|---|
| The presence of a Tornadic Vortex Signature (TVS). | YES or NO |
| The presence of Mesocyclonic activity (MESO) | YES or NO |
| Chance of Hail | 0% to 100% |
| Chance of Severe Hail | 0% to 100% |
| Hail Size in inches | 0.00" to 4.00+" |
| Maximum Storm DBZ (measurement of rainfall intensity) | 30 to 75+ DBZ |
| Height of max DBZ reading in the Storm | 1–75 thousand of feet |
| Storm Height | 1–75 thousand of feet |
| Storm position (latitude and longitude) | N/A |
| Storm forecasted angle | 0 to 359 degrees |
| Storm forecasted movement | 0 to 60+ mph |
| Storm Vertically Integrated Liquid (VIL) | 0 to 75+ kg/m$^3$ |

The database information is accessed to report the contents and characteristics of storms and to track the storms in near real-time.

Figure 1:
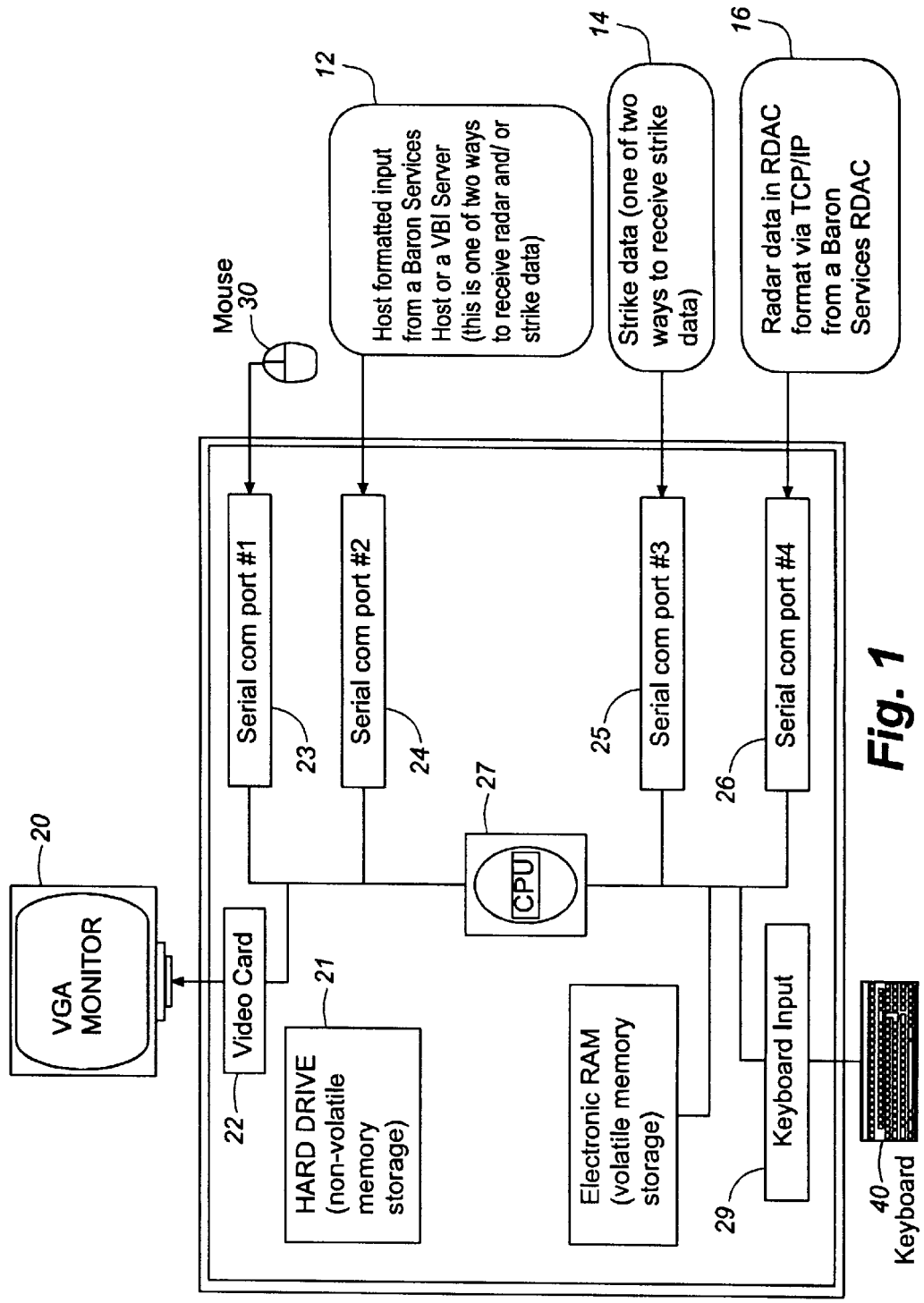
FIG. 1 is a diagram the preferred embodiment of the internal devices of a computer for use in the present invention.

Second, in response to a user request for a projection of a storm's movement, the system retrieves the NEXRAD Attributes information for a subject storm stored in the first step above. The user request may be made using a manual input device such as a mouse or keyboard as shown in FIG. 1.

Figure 2:
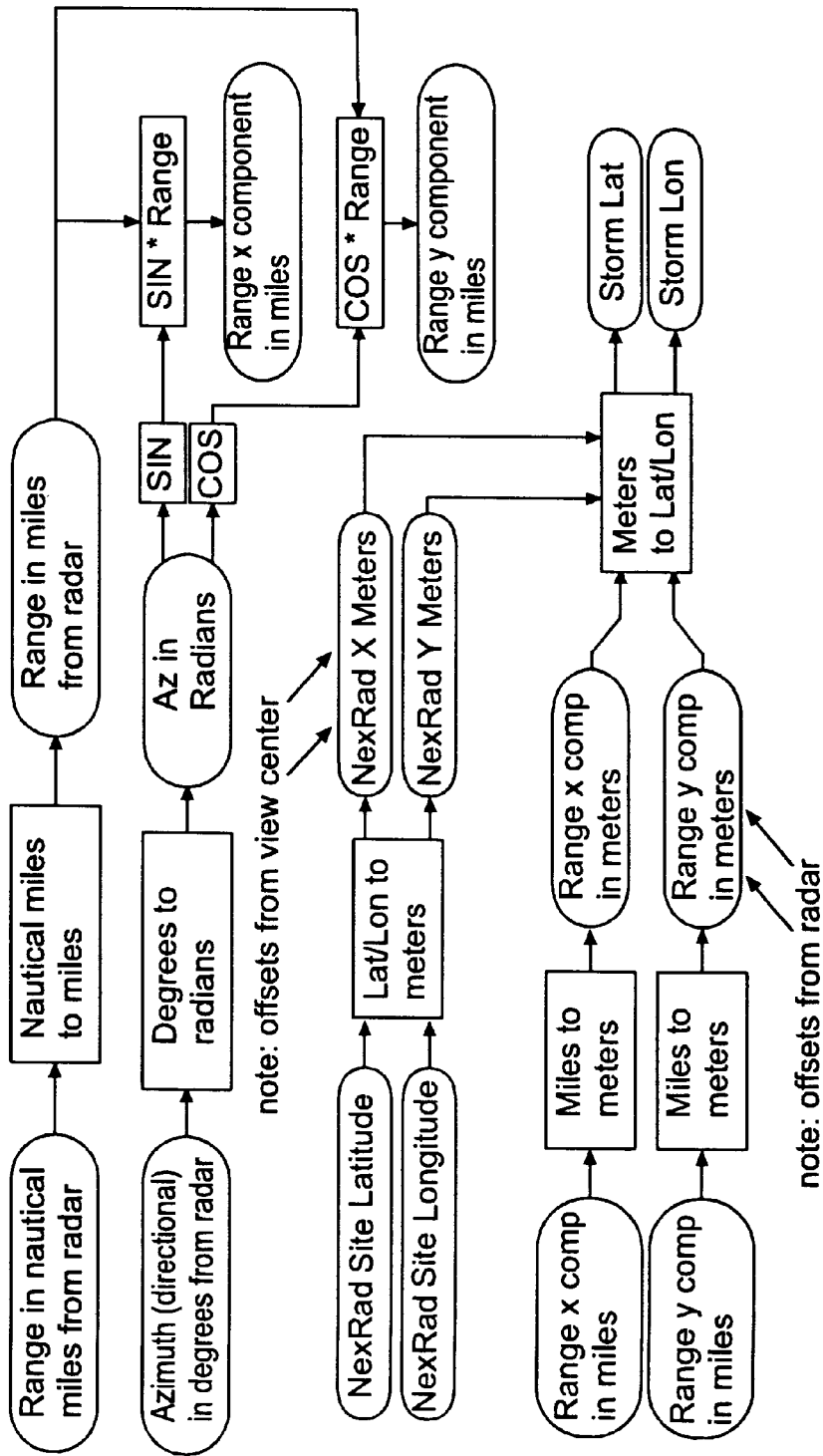
FIG. 2 is a diagram of the computer of FIG. 1 and its use of the NEXRAD radar's latitude/longitude and the storm's distance and direction from the NEXRAD radar to determine the storm's exact latitude and longitude.

Third, the system calculates a storm projection arc to create a graphical representation of the storm for display, said calculation comprising the steps of:

(a) Using the storms offset in meters from the view center of the graphical display (FIG. 2) to find the storm's position in latitude/longitude;

(b) Using the storm information (including fanout in degrees, direction in degrees, projection length in meters, and position as an offset in meters) to find the four corners of an arc describing the storm's projected path (the "storm projection arc");

(c) Using the storm information (including fanout in degrees, direction in degrees, projection length in meters, and position as an offset in meters) to find the storm's projected position after moving "length" meters;

(d) Using the storm information (including fanout in degrees, direction in degrees, projection length in meters, and position as an offset in meters) to find the center of a bounding circle that helps define the limits of the projection;

(e) Using the four corners of the storm projection arc to define the maximum latitude, maximum longitude, minimum latitude, and minimum longitude at which a place in this track may be positioned;

(f) Using the four corners of the storm projection arc (see b above) to define the bounding lines of the arc that will define the storm projection;

Fourth, a general database of geographical information (FIG. 3) is stored on the computer in the form of a database containing latitude and longitude information, as well as other identifying and prioritizing information for all known cities and communities, hereinafter "places", in the area of interest for a user of the present invention.

In a preferred embodiment, the places may be further grouped and related based upon their geographic proximity to each other such as being members of the same county, same state, same region, etc. The selected groups may be identified by minimum and maximum longitude and minimum and maximum latitude.

When determining which places are in the path of a storm, the following steps are performed:

1. If the places are grouped as described in the preferred embodiment, and the group's minimum latitude, minimum longitude, maximum latitude and maximum longitude indicate that none of the places in the group are within the arc of the storm projection, then skip that group of places;

2. Next, for each place not eliminated in step (1) above, do the following:

(a) If the place's latitude exceeds the minimum or maximum latitude requirements—skip it;

(b) If the place's longitude exceeds the minimum or maximum longitude requirements—skip it;

(c) If the place's priority level indicates that it should not appear at this track range (based on user-defined parameter for this particular track)—skip it; and (d) If the place's latitude/longitude is not within the bounding circle (see above)—skip it.

(The above elimination steps represent the preferred embodiment, but they may be performed in any order. In addition, the user may identify other bases for eliminating certain places from the eventual display.

Fifth, if a particular place has not been eliminated, it is within the path of the storm.

Sixth, by linear extrapolation, the current time, the storm's position, the storm's speed/direction, and the position of this place are used to determine the storm's ETA for this place.

Figure 4:
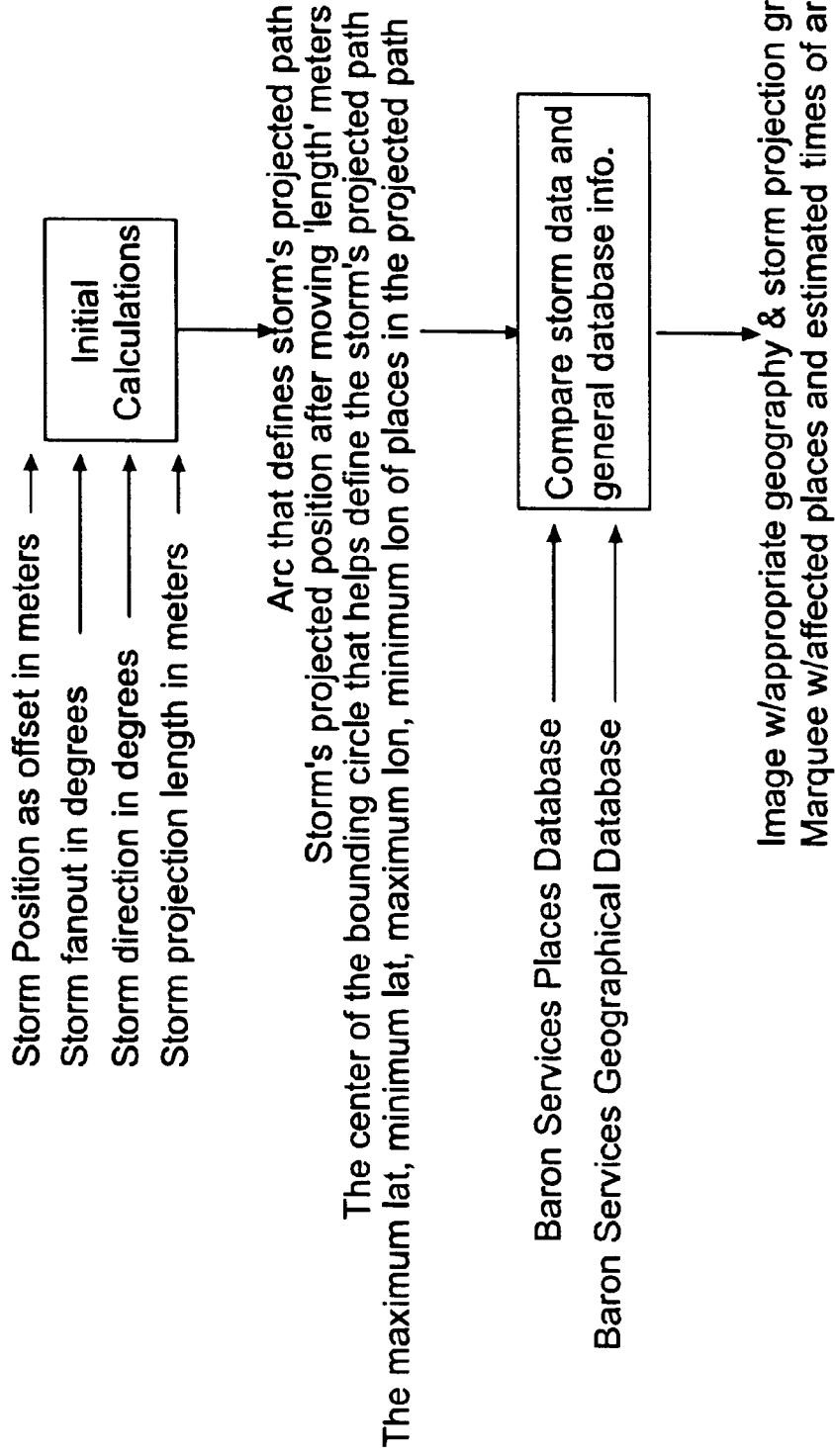
FIG. 4 is a diagram generally describing the storm tracking algorithm of the present invention.

Seventh, the system displays the storm projection arc, a topographical map of the affected area, and iconic representations of the places affected (refer to FIGS. 3 and 4 for general diagrams of this step) overlaid on top of a graphical representation of the storm.

Figure 5:
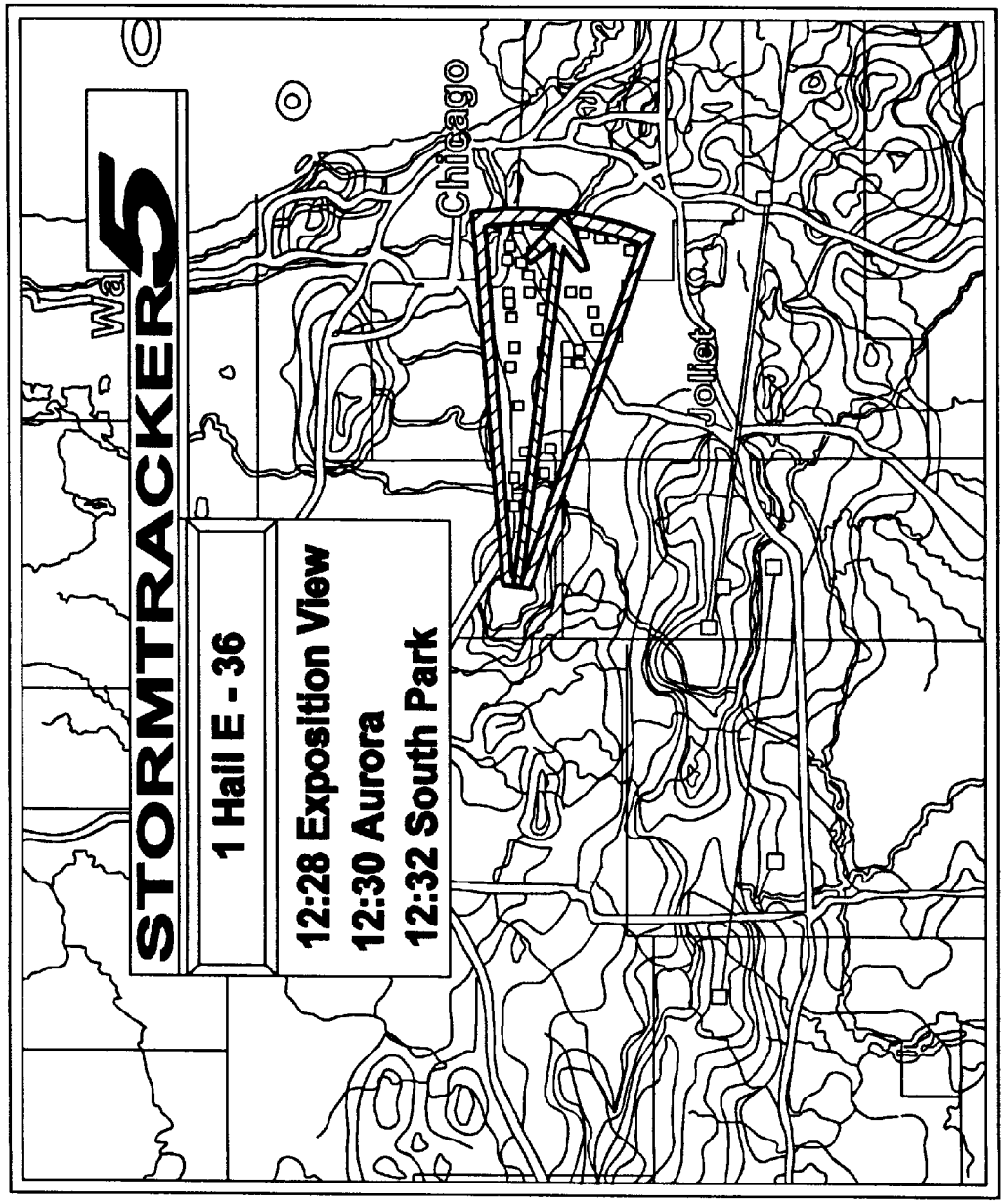
FIG. 5 is representative of a graphical output of the invention.

FIG. 5 illustrates a preferred embodiment of a display of projected storm movements, the communities within the path of a storm, and the ETA for each community.

Finally, in the case of multiple storms, a sorting technique is used to prioritize storms. The priorities for sorting are based upon the following criteria:

1. The presence of a Tornadic Vortex Signature (a.k.a. TVS). This is either YES or NO.

2. The presence of mesocyclonic activity (a.k.a. MESO). This is either YES or NO.

3. The presence and estimated size of hail (size is measured in inches and is accurate to ¼ of an inch).

4. The highest recorded DBZ (a measurement of the intensity of the rainfall).

5. The estimated storm speed in mph.

These sorting criteria are in order of importance. The criteria are plugged into the following formula to determine the "weight" of the storm. The storm with the greatest weight has the highest priority.

weight=0;

if TVS presence weight=weight+1,000,000,000 if MESO presence weight=weight+100,000,000 if hail size>0.00
   weight=weight+hail size * 10,000,000.0
weight=weight+DBZ * 100
weight=weight+speed (in mph)

This formula tracks and assures that each criteria has a larger weight factor than its successor.

It should be noted that, in addition to the storm prediction achieved through the novel and non-obvious use of the NEXRAD Attributes, the present invention improves over the prior art by merging the weather, storm, and prediction information described above with geographic and topological information to achieve an enhanced and visually-appealing display. This application allows the user to provide a graphical weather display which overlays storm information on top of actual geographical information. Combining these two forms of information allows the user of the present invention to provide to its viewers or consumers weather forecasting at its most advanced level.

The ease with which the user can use the present system to obtain a storm tracking prediction, is evidenced by the fact that the user need only select the storm cell of interest, and the storm position is displayed automatically. Therefore, viewers of weather forecasting displayed through the use of the present invention will have available prediction information specifically tailored to the viewers' own viewing area. For instance, viewers in small towns that previously could only guess at what time a storm would arrive at their location may now be given that information in a highly accurate and graphically appealing way. This improvement will detail exact and highly precise times at which storms or other weather phenomenon will arrive at any of several towns or cities in a geographical database provided with the present invention.

It should be understood to those skilled in the art that other modifications and changes can be made without departing from the spirit and scope of the invention and without diminishing its attendant advantages. It is therefore intended that such changes and modifications be covered by the following claims.

What is claimed is:

1. A method of using NEXRAD attributes to project a path of a storm for graphical display, said method comprising the steps of:
   (a) collecting a plurality of NEXRAD attributes corresponding to a storm and storing said plurality of NEXRAD attributes in a first database;
   (b) deriving a storm position in latitude and longitude from a first selected group of said plurality of stored NEXRAD attributes;
   (c) calculating a projected storm path using said derived storm position and a second selected group of said plurality of stored NEXRAD attributes;
   (d) displaying a graphical representation of said projected storm path, said projected storm path comprising a storm projection arc defining the boundary of said projected storm path by latitude and longitude;
   (e) retrieve geographical data stored in a second database by latitude and longitude, said geographical data comprising at least one area of interest including a plurality of populated areas; and
   (f) comparing said plurality of populated areas to said storm projection arc to determine which of said plurality of populated areas fall within said storm projection arc.

2. The method of claim 1 further comprising the step of:
   (g) displaying said plurality of populated areas falling within said storm projection arc.

3. The method of claim 2 further comprising the step of:
   (h) indicating an estimated time of arrival of said storm on the graphical display.

4. The method of claim 2 wherein said storm comprises a plurality of storms, each having an associated projected storm path including a storm projection arc, said method further comprising the steps of:
   (h) sorting said plurality of storms; and
   (i) prioritizing said plurality of storms.

5. The method of claim 4 wherein the step of sorting said plurality of storms comprises the steps of:
   comparing one or more of the NEXRAD attributes of one of said plurality of storms to the one or more NEXRAD attributes of the other of said plurality of storms; and
   assigning each of said plurality of storms a weight based upon said comparing step.

6. The method of claim 5 wherein said prioritizing step comprises the step of displaying said plurality of storms by said assigned weight.

7. A method of using NEXRAD attributes to project a path of a storm for graphical display, said method comprising the steps of:
   a) collecting a plurality of NEXRAD attributes corresponding to a storm and storing said plurality of NEXRAD attributes in a first database;
   b) deriving a storm position in latitude and longitude from said plurality of NEXRAD attributes;
   c) calculating a projected storm path using said derived storm position and said plurality of stored NEXRAD attributes;
   d) displaying a graphical representation of said projected storm path by latitude and longitude;
   e) retrieving geographical data stored in a second database by latitude and longitude, said geographical data comprising a plurality of populated areas defined by latitude and longitude; and
   f) comparing said plurality of populated areas to said projected storm path to determine which of said plurality of populated areas falls within said projected storm path.

8. The method of claim 7 further comprising the step of:
   g) displaying said plurality of populated areas falling within said projected storm path.

9. The method of claim 8 further comprising the step of:
   h) indicating an estimated time of arrival of said storm on the graphical display.

10. The method of claim 8 wherein said storm comprises a plurality of storms, each having an associated projected storm path, said method further comprising the steps of:
    h) sorting said plurality of storms; and
    i) prioritizing said plurality of storms.

11. The method of claim 10 wherein the step of sorting said plurality of storms comprises the steps of:
    comparing one or more of the plurality of stored NEXRAD attributes of one of said plurality of storms to the one or more stored NEXRAD attributes of the other of said plurality of storms; and
    assigning each of said plurality of storms a weight based upon said comparing step.

12. The method of claim 11 wherein said prioritizing step comprises the step of displaying said plurality of storms by said assigned weight.

13. A system using NEXRAD attributes to project a path of a storm for graphical display, said system comprising:

a) a first database comprising a plurality of extracted NEXRAD attributes, said NEXRAD attributes comprising a first group of data and a second group of data;

b) a second database comprising geographical data stored by latitude and longitude, said geographical data including at least one area of interest defining a plurality of populated areas defined by latitude and longitude;

c) a CPU communicating with said first database to calculate a storm position in latitude and longitude from said first group of data, said CPU combining said calculated storm position with said second group of data to calculate a projected storm path, said projected storm path comprising a storm projection arc, and communicating with said second database to compare said plurality of populated areas with said storm projection arc to determine which of said plurality of populated areas fall within said storm projection arc; and d) a display device communicating with said CPU to graphically display said plurality of populated areas falling within said storm projection arc.

14. A method of using NEXRAD attributes to project a storm's path on a graphical display, said method comprising the steps of:

a) collecting a plurality of NEXRAD attributes corresponding to a storm and storing said plurality of NEXRAD attributes in a first database;

b) deriving a storm position in latitude and longitude from a first selected group of said plurality of stored NEXRAD attributes;

c) calculating a projected storm path using said derived storm position and a second selected group of said plurality of stored NEXRAD attributes; and d) displaying a graphical representation of said projected storm path.

15. The method of claim 14 wherein said first selected group of said plurality of stored NEXRAD attributes comprises a storm range in nautical miles from a NEXRAD radar and a storm direction in degrees from said NEXRAD radar, and wherein said deriving step comprises converting said storm range in nautical miles and said storm direction in degree to a storm location in X and Y components of distance from said NEXRAD radar.

16. The method of claim 15 wherein the NEXRAD radar location in latitude and longitude is known and the graphical display includes a view center, and wherein said deriving step further comprises the step of converting the NEXRAD radar latitude and longitude to an X component and a Y component of distance from the view center.

17. The method of claim 16 further comprising the step of combining the X and Y component of said storm location and the X and Y component of said radar location to arrive at a storm offset in X and Y component of distance from the view center.

18. The method of claim 17 further comprising the step of converting the storm offset from view center to said storm position in latitude and longitude on the graphical display.

19. The method of claim 15 further comprising the steps of:

e) determining which community or communities from a plurality of communities stored in a second database will be affected by said projected storm path; and f) displaying the affected community or communities.

20. The method of claim 19 further comprising the step of indicating the estimated time each community will be affected by said projected storm path.

21. The method of claim 14 wherein said storm comprises a plurality of storms and wherein the method further comprises the steps of:

e) sorting said plurality of storms; and f) displaying said sorted storms in order of priority.

22. The method of claim 21 further comprising the step of selecting one of said plurality of storms, whereby said graphical representation of said projected storm path corresponding to said selected storm is automatically displayed.

* * * * *

UNITED STATES PATENT AND TRADEMARK OFFICE
CERTIFICATE OF CORRECTION

PATENT NO : 6,125,328
DATED : September 26, 2000
INVENTOR(S) : Robert O. Baron et al.

It is certified that error appears in the above-identified patent and that said Letters Patent are hereby corrected as shown below:

Col. 3, between lines 23 and 24 (after "Storm Vertically Integrated Liquid (VIL)"), in the Attribute column, insert --Range in nautical miles from radar Azimuth (direction) in degrees from radar--.

Col. 8, line 4
  replace "degree "
  with --degrees--.

Col. 8, line 15
  replace "component"
  with --components--.

Signed and Sealed this

Twenty-fourth Day of April, 2001

Attest:

NICHOLAS P. GODICI

*Attesting Officer*  *Acting Director of the United States Patent and Trademark Office*